(12) United States Patent
Ohshima

(10) Patent No.: US 8,422,183 B2
(45) Date of Patent: Apr. 16, 2013

(54) OVERCURRENT DETECTING APPARATUS

(75) Inventor: Shunzou Ohshima, Toyota (JP)

(73) Assignee: Yazaki Corporation, Tokyo (JP)

( * ) Notice: Subject to any disclaimer, the term of this patent is extended or adjusted under 35 U.S.C. 154(b) by 157 days.

(21) Appl. No.: 11/477,618

(22) Filed: Jun. 30, 2006

(65) Prior Publication Data

US 2007/0008672 A1    Jan. 11, 2007

(30) Foreign Application Priority Data

Jul. 7, 2005    (JP) ............................... P2005-198731

(51) Int. Cl.
    *H02H 3/08*    (2006.01)
(52) U.S. Cl.
    USPC ........................................................ 361/93.1
(58) Field of Classification Search .................. 361/93.1
    See application file for complete search history.

(56) References Cited

U.S. PATENT DOCUMENTS

| | | | |
|---|---|---|---|
| 4,945,445 A * | 7/1990 | Schmerda et al. ............ | 361/101 |
| 5,164,877 A * | 11/1992 | Furuhata et al. .............. | 361/111 |
| 5,510,943 A * | 4/1996 | Fukunaga ...................... | 361/18 |
| 5,550,702 A * | 8/1996 | Schmidt et al. ............... | 361/103 |
| 5,642,034 A * | 6/1997 | Amano .......................... | 323/277 |
| 5,895,989 A | 4/1999 | Imaizumi et al. | |
| 5,926,010 A * | 7/1999 | Hosokawa et al. ........... | 323/222 |
| 6,727,745 B2 * | 4/2004 | Shearon et al. ............... | 327/541 |
| 6,985,341 B2 | 1/2006 | Vinciarelli et al. | |
| 2002/0024334 A1 | 2/2002 | Dames | |
| 2004/0012905 A1 * | 1/2004 | Yamamoto ................... | 361/93.8 |
| 2004/0156154 A1 * | 8/2004 | Lazarovich et al. .......... | 361/42 |

FOREIGN PATENT DOCUMENTS

| | | | |
|---|---|---|---|
| DE | 19746682 A1 | | 5/1998 |
| DE | 69905044 T2 | | 9/2003 |
| EP | 0860946 A2 | | 8/1998 |
| EP | 0968871 A2 | | 1/2000 |
| JP | 4-61432 U | | 5/1992 |
| JP | 4-142468 A | | 5/1992 |
| JP | 5-026912 A | | 2/1993 |
| JP | 6-074981 A | | 3/1994 |
| JP | 08019267 | * | 1/1996 |
| JP | 10-014099 A | | 1/1998 |
| JP | 2001-326432 A | | 11/2001 |
| JP | 2002-017036 A | | 1/2002 |
| JP | 2002-353794 A | | 12/2002 |
| JP | 2003-009385 A | | 1/2003 |

OTHER PUBLICATIONS

English translation of abstract of JP 08019267.*
English translation of JP 08019267 A.*
German Office Action issued Dec. 8, 2008.

* cited by examiner

*Primary Examiner* — Jared Fureman
*Assistant Examiner* — Nicholas Ieva
(74) *Attorney, Agent, or Firm* — Sughrue Mion, PLLC

(57) ABSTRACT

A voltage (V1−V2) between a predetermined point P2 on a copper foil pattern 4 connected to a source of a switching FET (T1) and a drain P1 of the FET (T1) is input into an input terminal of a comparator CMP1 as an overcurrent determination voltage for comparison with a reference voltage V3. As this occurs, since there exists a voltage that is to be dropped by a resistor Rp possessed by the copper foil 4, the voltage (V1−V2) becomes larger than an inter-terminal voltage VDS of the FET (T1), and as a result, the effect imposed by an offset voltage $V_{off}$ possessed by the comparator CMP1 can be reduced.

4 Claims, 2 Drawing Sheets

RELATED ART

OVERCURRENT DETECTING APPARATUS

BACKGROUND OF THE INVENTION

1. Field of the Invention

The present invention relates to an overcurrent detecting apparatus for detecting the occurrence of an overcurrent by detecting a voltage between terminals of a semiconductor switch which operates to switch on and off, for example, a direct current load circuit for comparison with a reference voltage.

2. Description of the Related Art

In, for example, a load control circuit for controlling power window driving motor installed on a vehicle, a semiconductor switch such as an FET is provided between a direct current power supply and the motor, so as to be switched between on and off to thereby control the driving and stopping of the motor. In addition, in the load control circuit like this, an overcurrent detecting circuit is provided for detecting an overcurrent such as a short circuit current when the overcurrent flows into a load or harness, and when an overcurrent is detected, the semiconductor switched is immediately interrupted so as to protect the whole circuit including the semiconductor switch (for example, refer to JP-A-2002-353794).

FIG. 2 is a circuit diagram which shows the configuration of a conventional load control circuit. As shown in the figure, a load controls circuit includes a direct current power supply VB, a load 101 such as a motor and a switching FET (T101), and a positive terminal of the direct current power supply VB and a drain of the FET (T101) are connected together, a source of the FET (T101) and one end of the load 101 are connected together, and the other end of the load 101 and a negative terminal of the direct current power supply are grounded.

In addition, the drain (voltage V1) of the FET (T101) is grounded via a series connecting circuit of resistors R101, R102. Then, a connecting point (voltage V3) between the resistors R101 and R102 is connected to a negative side input terminal of a comparator CMP101.

Furthermore, the source (voltage V2) of the FET (T101) is connected to a positive side input terminal of the comparator CMP 101. In addition, a driver circuit 102 is provided for controlling the switching of the FET (T101) between on and off, wherein an output terminal of the driver circuit 102 is connected to a gate of the FET (T101) via a resistor 103.

Here, assuming that an on resistance of the FET (T101) is Ron and a drain current is ID, a voltage VDS between the source and the drain of the FET (T101) will be expressed the following equation (1).

$$VDS = V1 - V2 = Ron * ID \quad (1)$$

Then, when an overcurrent flows to the load 101, putting ID in an overcurrent state, the voltage VDS increases, resulting in (V1−V2)>(V1−V3), and an output signal of the comparator CMP 101 is reversed, whereby an overcurrent is detected in a circuit at a subsequent stage (not shown), and a low level voltage is output from the driver circuit 102 to the gate of FET(T101). As a result, since the FET (T101) is switched off, the circuit can be protected from the overcurrent.

Here, assuming that a value of ID which is detected as an overcurrent current is $I_{OVC}$, and an offset voltage of the comparator CMP101 is $V_{off}$, the following equation (2) is obtained.

$$V1 - V3 = Ron * I_{OVC} +/- V_{off} \quad (2),$$

wherein "+/−" means that Voff is add or subtracted from Ron*Lovc.

The following equation (3) is obtained from the equation (2) above.

$$I_{OVC} = \{(V1-V3)/Ron\} +/- (V_{off}/Ron) \quad (3)$$

Here, in case the offset voltage $V_{off}$ does not exist in the comparator CMP101, namely, $V_{off}=0$, the overcurrent detection value $I_{OVC}$ becomes a constant value which is determined by the voltage V3 and the on resistance Ron of the FET (T101). In case the offset voltage $V_{off}$ exists in the comparator CMP101, however, the overcurrent detection value IOVC varies, and the amount of variation thereof becomes +/−$V_{off}$/Ron. Namely, with the offset voltage $V_{off}$ remaining the same, the smaller the on resistance Ron becomes, the more largely the overcurrent detection value $I_{OVC}$ varies.

The extent or width of variation of the offset voltage (+/−$V_{off}$) of the comparator CMP101 depends on the process of fabricating ICs, and with a normal IC, there is provided a variation width of the order of +/−10 [mV].

As has been described above, the offset voltage $V_{off}$ of the comparator CMP101 constitutes a cause for the variation in the overcurrent detection value and causes a problem that the accuracy of the overcurrent detection value is deteriorated. Furthermore, in the event that there is an increasing tendency that the on resistance Ron of the FET is reduced in the future, the effect of the offset voltage increases further and the reduction in accuracy becomes larger, and to cope with this, there exists an increasing demand for some measures for reducing the effect of the offset voltage of the comparator CMP 101.

SUMMARY OF THE INVENTION

The invention was made with a view to solving the problem inherent in the related art, and an object thereof is to provide an overcurrent detecting apparatus which can reduce the effect of the offset voltage $V_{off}$ of the comparator CMP101 so as to enable a highly accurate overcurrent detection even when the on resistance Ron is small.

With a view to accomplishing the object, according to a first aspect of the invention, there is provided an overcurrent detecting apparatus for detecting the occurrence of an overcurrent in a load circuit having a direct current power supply and a load, having a printed circuit board provided between the direct current power supply and a load, the printed circuit board having, in turn, a semiconductor switch provided between the direct current power supply and the load, so as to be switched between on and off and a metal foil pattern provided between the semiconductor switch and a connecting point with the load, and further comprising a driver circuit for controlling the driving of the semiconductor switch, and a comparing unit for comparing a reference voltage obtained by dividing the voltage of the direct current power supply to an overcurrent determination voltage resulting from the addition of a terminal voltage of the semiconductor switch to a voltage generated in the metal foil pattern, wherein the driver circuit switches off the semiconductor when the comparing unit determines that the overcurrent determination voltage has exceeded the reference voltage.

According to a second aspect of the invention, there is provided an overcurrent detecting apparatus as set forth in the first aspect of the invention, wherein the driver circuit and the comparing means are installed on the printed circuit board.

According to a third aspect of the invention, there is provided an overcurrent detecting apparatus as set forth in the first or second aspect of the invention, wherein the metal foil pattern is a strip-shaped copper foil.

According to the first aspect of the invention, since the voltage resulting from the addition of the voltage VDS generated at both ends of the semiconductor switch to the voltage generated in the resistance Rp possessed by the metal foil pattern is made to be input into the comparing unit as the overcurrent determination voltage for comparison with the reference voltage, the effect by the offset voltage possessed by the comparing unit can be reduced, whereby the variation in the current value which determines an overcurrent can be reduced, and when a predetermined overcurrent flows into the load, the overcurrent can be immediately detected, so as to interrupt the circuit immediately, thereby making it possible to protect the semiconductor switch and the load circuit.

According to the second aspect of the invention, since the driver circuit and the comparing unit are installed on the printed circuit board, the circuit configuration can be made small in size, and hence, a space needed therefor can be saved.

According to the third aspect of the invention, since the metal foil pattern is formed into the strip-like shape, a desired resistance value (Rp) can be set easily.

BRIEF DESCRIPTION OF THE INVENTION

DESCRIPTION OF THE PREFERREED EMBODIMENTS

Figure 1:
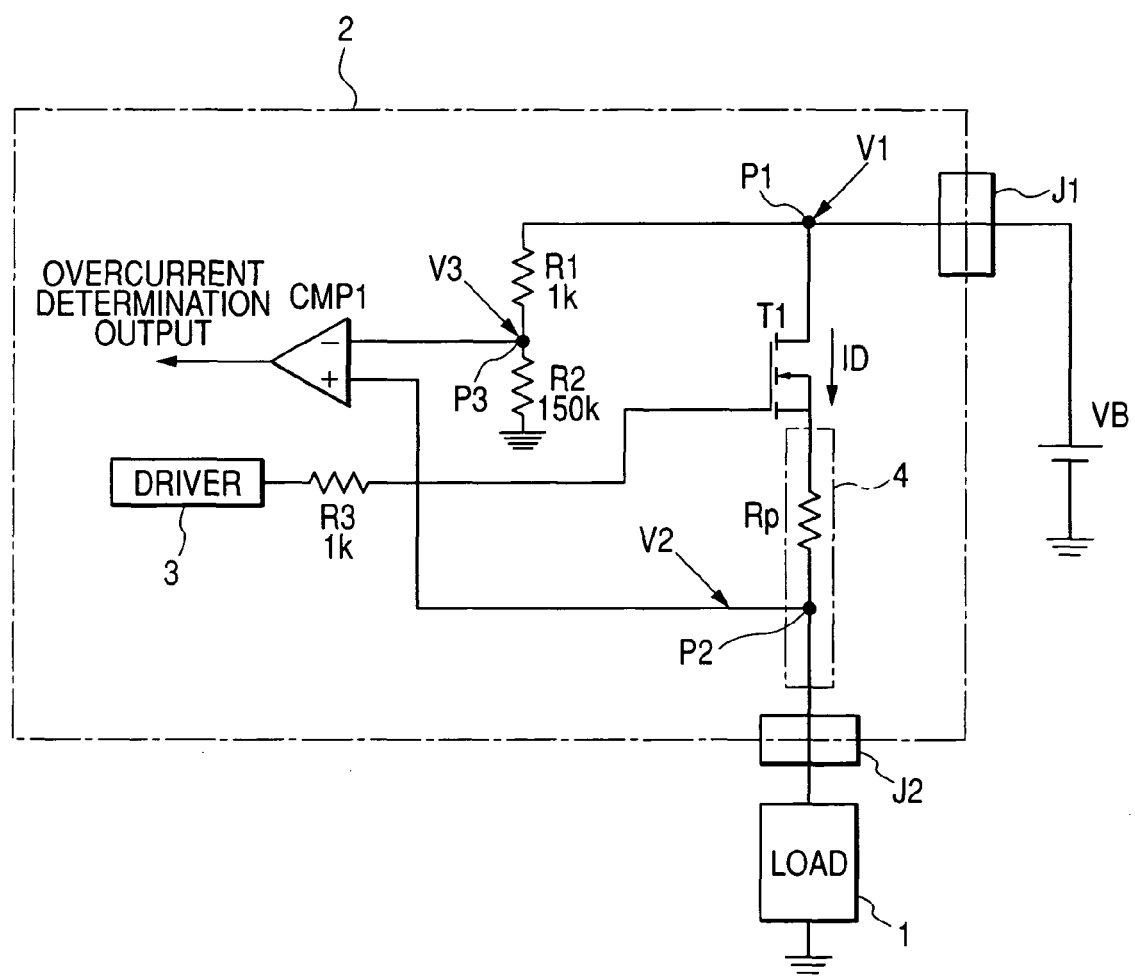
FIG. 1 is a circuit diagram which shows the configuration of an overcurrent detecting apparatus according to an embodiment of the invention.
Figure 2:
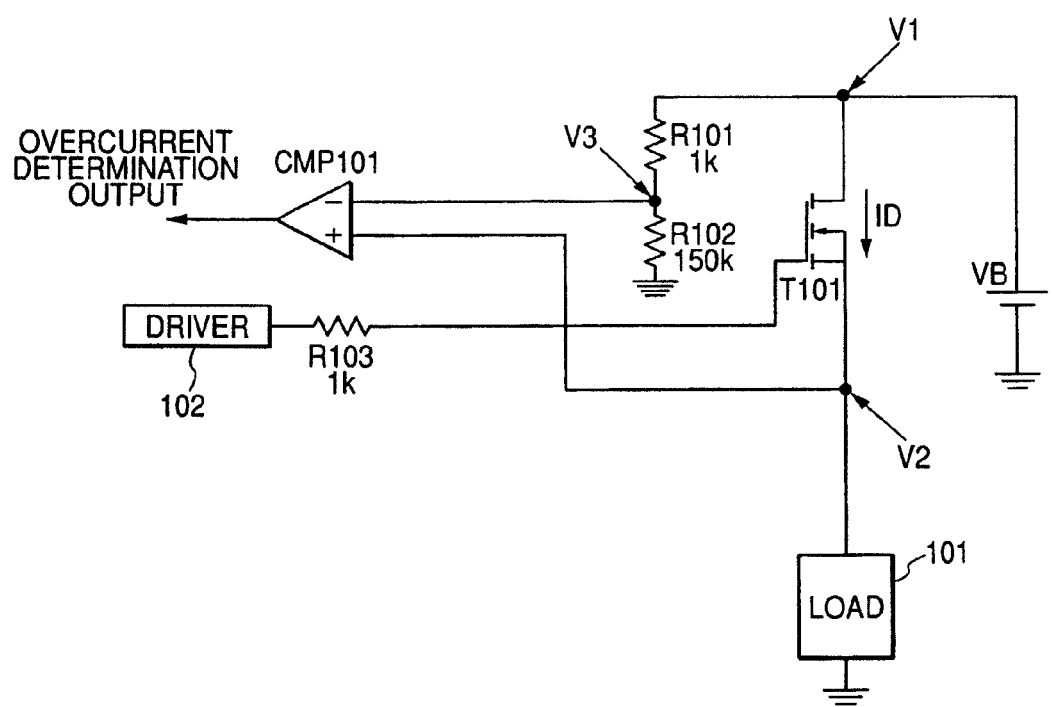
FIG. 2 is a circuit diagram which shows the configuration of a conventional overcurrent detecting apparatus.

Hereinafter, an embodiment of the invention will be described based on the accompanying drawing. FIG. 1 is a circuit diagram which shows the configuration of an overcurrent detecting apparatus according to an embodiment of the invention. As shown in the figure, this overcurrent detecting apparatus is formed on a printed circuit board 2 which is provided between a direct current power supply VB and a load 1.

The direct current power supply VB and the printed circuit board 2 are connected together by a connector J1, and the load 1 and the printed circuit board 2 are connected together by a connector J2. A point P1 (Voltage V1), which constitutes the connector J1, is connected to a drain of a switching FET (T1: semiconductor switch), and a source of the FET (T1) is connected to the connector J2 via copper foil pattern (a metal foil pattern) 4. In addition, a gate of the FET (T1) is connected to a driver circuit 3 via a resistor R3, and the FET (T1) is on and off controlled by a control signal output from the driver circuit 3.

Furthermore, the point P1 is grounded via a series connection circuit of resistors R1 and R2, and a connecting point P3 between the resistors R1, R2 is connected to a negative side input terminal of a comparator CMP1.

In addition, a predetermined point P2 of the copper foil pattern 4 is connected to a positive side input terminal of the comparator CMP1. The copper foil pattern 4 has a resistor Rp.

Next, the function of the overcurrent detecting apparatus, which is configured as described above, according to the embodiment will be described.

When a driving signal is output from the driver circuit 3 to be supplied to the gate of the FET (T1), the FET (T1) is switched on, and a current ID is allowed to flow from the direct current power supply VB via the FET (T1), so as to drive the load 1. As this occurs, since a voltage V1 generated at the point P1 is applied to the series connection circuit made up of the resistors R1 and R2, the voltage V3 of the connecting point P3 between the resistors R1 and R2 becomes a voltage V3 which results from dividing the voltage V1 by the resistors R1, R2. Namely, the voltage V3 is obtained from the following equation (4).

$$V3=(V1*R2)/(R1+R2) \quad (4)$$

Then, this voltage V3 is input to the negative side input terminal of the comparator CMP1.

On the other hand, an inter-terminal voltage VDS is generated between the drain and source of the FET (T1) due to the current ID flowing into the FET (T1). Assuming that an on resistance of the FET (T1) is Ron, the voltage VDS can be expressed by the aforesaid equation (1).

$$VDS=Ron*ID \quad (1)$$

In addition, a voltage drop expressed by (ID*Rp) is produced between the source of the FET (T1) and the point P2 due to the current ID flowing through the copper pattern 4. Consequently, a total voltage drop from the point P1 to the point P2 (V1−V2; overcurrent determination voltage) is expressed by the following equation (5).

$$V1-V2=(Ron+Rp)*ID \quad (5)$$

Then, the voltage V2 is supplied to the positive side input terminal of the comparator CMP1. Normally (that is, when no overcurrent is generated), a relationship between the voltage drop and a reference voltage (V1−V3) is set to result in (V1−V2)<(V1−V3), and when an overcurrent is generated to increase the current ID and the voltage (V1−V2) shown in the equation (5) increases, resulting in (V1−V2)>(V1−V3), namely, when the overcurrent determination voltage exceeds the reference voltage, the output signal of the comparator CMP1 is reversed, whereby an overcurrent state is determined.

Assuming that a current ID resulting when the output signal is reversed is $I_{OVC}$, and an offset voltage of the comparator CMP1 is $V_{off}$, the following equation (6) is established.

$$V1-V3=(Ron+Rp)I_{OVC}+/-V_{off} \quad (6)$$

By modifying this equation, an equation (7) is obtained.

$$I_{OVC}=(V1-V3)/(Ron+Rp)+/-V_{off}/(Ron+Rp) \quad (7)$$

Here, the aforesaid equation (3) is shown as below.

$$I_{OVC}=\{(V1-V3)/Ron\}+/-(V_{off}/Ron) \quad (3)$$

Then, when comparing the equation (7) to the equation (3), in the equation (3), the second term of the right-hand member is ($V_{off}$/Ron), whereas that in the equation (7) is $V_{off}$/(Ron+Rp), and it is understood from this that the effect of $V_{off}$ becomes smaller in the equation (7) than the equation (3) by such an extent that Rp is added to the denominator. Namely, as shown in FIG. 1, the effect of the offset voltage $V_{off}$ of the comparator CMP1 can be reduced by providing the resistor Rp made by the copper foil pattern 4 between the source of the FET (T1) and the point P2.

Here, for example, the size of the resistor Rp is set as follows. Namely, the pattern of the copper foil 4 which makes up the resistor Rp is, for example, 3 [mm] wide, 70 [μm] high and 50 [mm] long. Additionally, since the resistance of a copper wire having a cross-sectional area of 1 [mm$^2$] and a length of 1 [m] is known as 20.2 [mΩ], the resistance of the resistor Rp becomes 4.8 [mΩ] from the following equation (8).

$$Rp=20.2*1/(3*0.07)*50/1000=4.8[m\Omega]$$

In addition, since the resistance of a normally used resistor Ron is on the order of 5 [mΩ], the effect of variation due to the offset voltage $V_{off}$ of the comparator CMP1 can be reduced by half by adding a voltage that is dropped by the resistor Rp to the voltage between the drain and source of the FET (T1) for comparison with the overcurrent determination value (V1−V3).

Furthermore, the copper foil pattern 4 is an inevitable constituent element in forming a circuit path to the printed circuit board 2 and a negative source which constitutes a cause for generation of Joule heat. In this embodiment, such a negative source is effectively used by utilizing the copper foil pattern 4 which functions as the negative source as described above as part of the overcurrent detecting sensor.

Thus, in the overcurrent detecting apparatus according to the invention, since the voltage V2 generated at the desired point P2 of the copper foil pattern 4 connected to the source of the FET (T1) is supplied to the positive side input terminal of the comparator CMP1, the effect imposed by the offset voltage $V_{off}$ of the comparator CMP1 can be reduced by virtue of the existence of the resistor Rp on the copper foil pattern 4. Consequently, the variation in overcurrent determination value that is caused by the comparator CMP1 can be reduced, so as to set a determination voltage for the occurrence of an overcurrent with high accuracy.

Thus, while the overcurrent detecting apparatus of the invention has been described based on the illustrated embodiment, the invention is not limited thereto, and the configuration of each constituent component can be substituted by an arbitrary configuration having the similar function.

For example, while the embodiment has been described, as an example, as reducing the effect of the offset voltage $V_{off}$ using the resistor Rp provided on the strip-shaped copper foil pattern 4 which resides between the source of the FET (T1) and the connector J2, the invention is not limited to the strip shape with reference to the shape of the copper foil pattern 4, and even in the event that any other shapes are used, the same effect can be obtained.

In addition, while the embodiment has been described, as an example, as installing the driver circuit 3 and the comparator CMP1 on the printed circuit board 2, a configuration can be adopted in which the relevant components are not installed on the printed circuit board 2.

The invention is extremely useful in detecting the generation of an overcurrent with high accuracy.

What is claimed is:

1. An overcurrent detecting apparatus for detecting the occurrence of an overcurrent in a load circuit having a direct current power supply and a load, comprising:
   a printed circuit board, provided between the direct current power supply and the load, and comprising:
   a semiconductor switch, comprising a MOSFET, provided between the direct current power supply and the load, so as to be switched between on and off; and
   a metal foil pattern, provided in series between the semiconductor switch and the load, the metal foil pattern having a cross-sectional area and a length;
   a driver circuit, controlling the driving of the semiconductor switch; and
   a comparator, comparing a reference voltage obtained by dividing the voltage of the direct current power supply with an overcurrent determination voltage resulting from adding a voltage between terminals of the semiconductor switch, which is proportional to a drain current of the semiconductor switch, to a voltage generated in the metal foil pattern;
   wherein the driver circuit switches off the semiconductor switch in case that the comparator determines that the overcurrent determination voltage has exceeded the reference voltage, and
   wherein the metal foil pattern is configured to reduce an effect imposed by an offset voltage of the comparator, and to increase an accuracy in the detecting of the occurrence of the overcurrent in the load circuit, by and wherein the cross-sectional area of the metal foil pattern and the length of the metal foil pattern are determined based on a determination of a factor by which to reduce the imposed effect with respect to a resistance of the semiconductor switch.

2. The overcurrent detecting apparatus according to claim 1, wherein the driver circuit and the comparator are installed on the printed circuit board.

3. The overcurrent detecting apparatus according to claim 1, wherein the metal foil pattern is a strip-shaped copper foil.

4. The overcurrent detecting apparatus according to claim 1, wherein the metal foil pattern is configured to have a predetermined resistance based on a resistance of the semiconductor switch.

* * * * *